(12) United States Patent
Deaver

(10) Patent No.: US 7,487,616 B2
(45) Date of Patent: Feb. 10, 2009

(54) RAIL CAR DOOR SEALING GASKET

(75) Inventor: Ralph A. Deaver, Dickson, TN (US)

(73) Assignee: Central Sales & Service, Inc., Waverly, TN (US)

( * ) Notice: Subject to any disclaimer, the term of this patent is extended or adjusted under 35 U.S.C. 154(b) by 0 days.

(21) Appl. No.: 11/099,294

(22) Filed: Apr. 5, 2005

(65) Prior Publication Data
US 2006/0220328 A1  Oct. 5, 2006

(51) Int. Cl.
*E06B 7/22* (2006.01)
*E06B 7/086* (2006.01)
*E06B 7/28* (2006.01)
*E06B 7/16* (2006.01)
*E05F 11/36* (2006.01)
*F16L 17/073* (2006.01)
*H02G 15/04* (2006.01)
*F16J 15/02* (2006.01)

(52) U.S. Cl. .......... 49/498.1; 49/91.1; 49/316; 49/355; 49/475.1; 277/612; 277/637; 277/648

(58) Field of Classification Search ........... 277/612, 277/630, 637, 640, 644, 648, 921; 49/91.1, 49/303, 316, 355, 475.1, 466, 490.1
See application file for complete search history.

(56) References Cited

U.S. PATENT DOCUMENTS

| | | | |
|---|---|---|---|
| 2,263,806 A | 11/1941 | Hammerl | |
| 2,640,230 A | 6/1953 | Eck et al. | |
| 2,907,080 A | 10/1959 | Beauchamp et al. | |
| 2,935,771 A | 5/1960 | Hatcher, Jr. | |
| 3,214,879 A * | 11/1965 | Ellingson, Jr. et al. | ........ 52/393 |
| 3,226,780 A | 1/1966 | Landis | |
| 3,371,445 A | 3/1968 | Herr et al. | |
| 3,452,481 A | 7/1969 | Bailey | |
| 3,501,868 A * | 3/1970 | Ganzinotti | ................. 49/477.1 |
| 3,562,957 A | 2/1971 | Landis | |
| 4,010,573 A | 3/1977 | Andrzejewski | |
| 4,255,903 A | 3/1981 | Reynolds et al. | |
| 5,148,643 A | 9/1992 | Sampson et al. | |
| 5,581,951 A * | 12/1996 | Ryan et al. | ................. 49/498.1 |
| 6,401,398 B1 * | 6/2002 | Panayides et al. | .......... 49/498.1 |
| 2005/0029751 A1 * | 2/2005 | Schmid | ..................... 277/637 |

* cited by examiner

*Primary Examiner*—Patricia L Engle
*Assistant Examiner*—Jonathan J Liu
(74) *Attorney, Agent, or Firm*—Stephen T. Belsheim

(57) ABSTRACT

A sealing gasket that provides a seal between two members. The gasket includes a base at one end of the gasket and a gutter-forming surface at the opposite other end of the gasket. There is a pair of sides that join the one end and the opposite other end of the gasket. The sealing gasket is movable between a compressed condition wherein the gasket provides a seal between the two members and an uncompressed condition wherein the gasket does not provide a seal between the two members. When the gasket is in the compressed condition, the gutter-forming surface deforms to form a gutter along the one end of the gasket.

14 Claims, 3 Drawing Sheets

RAIL CAR DOOR SEALING GASKET

BACKGROUND

The invention pertains to a sealing gasket that provides a seal between two members. More specifically, the invention pertains to a sealing gasket that provides a seal between overlapping members of a rail car door assembly.

As can be appreciated, there has always been a need to provide a seal of a rail car door assembly. Such a seal keeps water and other contaminants from entering into the rail car and damaging the contents of the rail car (e.g., a rail boxcar). Heretofore, such gasket seals have existed and one is described in issued U.S. Pat. No. 5,581,951 to Ryan et al. The Ryan et al. patent describes what is called a rail car crown gasket that provides a seal between the rail car doors wherein the seal is at the location of the overlap between the auxiliary rail car door and the main rail car door.

Other United States patents disclose sealing gaskets. These patents include the following United States patents: U.S. Pat. No. 2,935,771 to Hatcher, Jr., U.S. Pat. No. 2,263,806 to Hammerl, U.S. Pat. No. 2,640,230 to Eck et al., U.S. Pat. No. 2,907,080 to Beauchamp et al., U.S. Pat. No. 3,452,481 to Bailey, U.S. Pat. No. 3,562,957 to Landis, U.S. Pat. No. 4,010,573 to Andrzejewski, U.S. Pat. No. 4,255,903 to Reynolds et al., and U.S. Pat. No. 5,148,643 to Sampson et al.

While these other sealing gaskets provide a seal, there remains a need to provide a sealing gasket, and especially a sealing gasket between overlapping members of a rail car door assembly, that provides an effective seal by providing for multiple sealing points between the overlapping members of the rail car door assembly. There also remains a need to provide a sealing gasket, and especially a sealing gasket between overlapping members of a rail car door assembly, that provides an effective seal by providing for the sealing between the gasket and the retainer that holds the sealing gasket. There is also a need to provide a sealing gasket, and especially a sealing gasket between overlapping members of a rail car door assembly, that provides an effective seal by providing for a gutter that facilitates carrying away water or other contaminants from the rail car doors.

SUMMARY

In one form thereof, the invention is a sealing gasket that provides a seal between two members. The gasket comprises a base at one end of the gasket and a gutter-forming surface at the opposite other end of the gasket. There are a pair of sides that join the one end and the opposite other end of the gasket. The sealing gasket is movable between a compressed condition wherein the gasket provides a seal between the two members and an uncompressed condition wherein the gasket does not provide a seal between the two members. When the gasket is in the compressed condition, the gutter-forming surface deforms to form a gutter along the one end of the gasket.

In one form thereof, the invention is a sealing gasket-retainer assembly that provides a seal between two members. The assembly comprises a retainer that is affixed to one of the members. There is a gasket that comprises a base at one end of the gasket and the gasket is attached at the base thereof to the retainer. The gasket further comprises an opposite other end. A pair of sides join the one end and the opposite other end of the gasket. At least one retainer seal projects from one of the side surfaces. The sealing gasket is movable between a compressed condition wherein the gasket provides a seal between the two members and an uncompressed condition wherein the gasket does not provide a seal between the two members. When the gasket is in the compressed condition, the retainer seal deforms to so as to contact the retainer and form a seal with the retainer.

In yet another form thereof, the invention is a sealing gasket that provides a seal between two members. The gasket comprises a base at one end of the gasket and a flat surface at the opposite other end of the gasket wherein the flat surface has at least one edge. There is a pair of sides that join the one end and the opposite other end of the gasket. The sealing gasket is movable between a compressed condition wherein the gasket provides a seal between the two members and an uncompressed condition wherein the gasket does not provide a seal between the two members. When the gasket is in the compressed condition, the flat surface deforms so as that the edge contacts one of the members.

BRIEF DESCRIPTION OF THE DRAWINGS

The following is a brief description of the drawings that form a part of this patent application.

DETAILED DESCRIPTION

Figure 1:
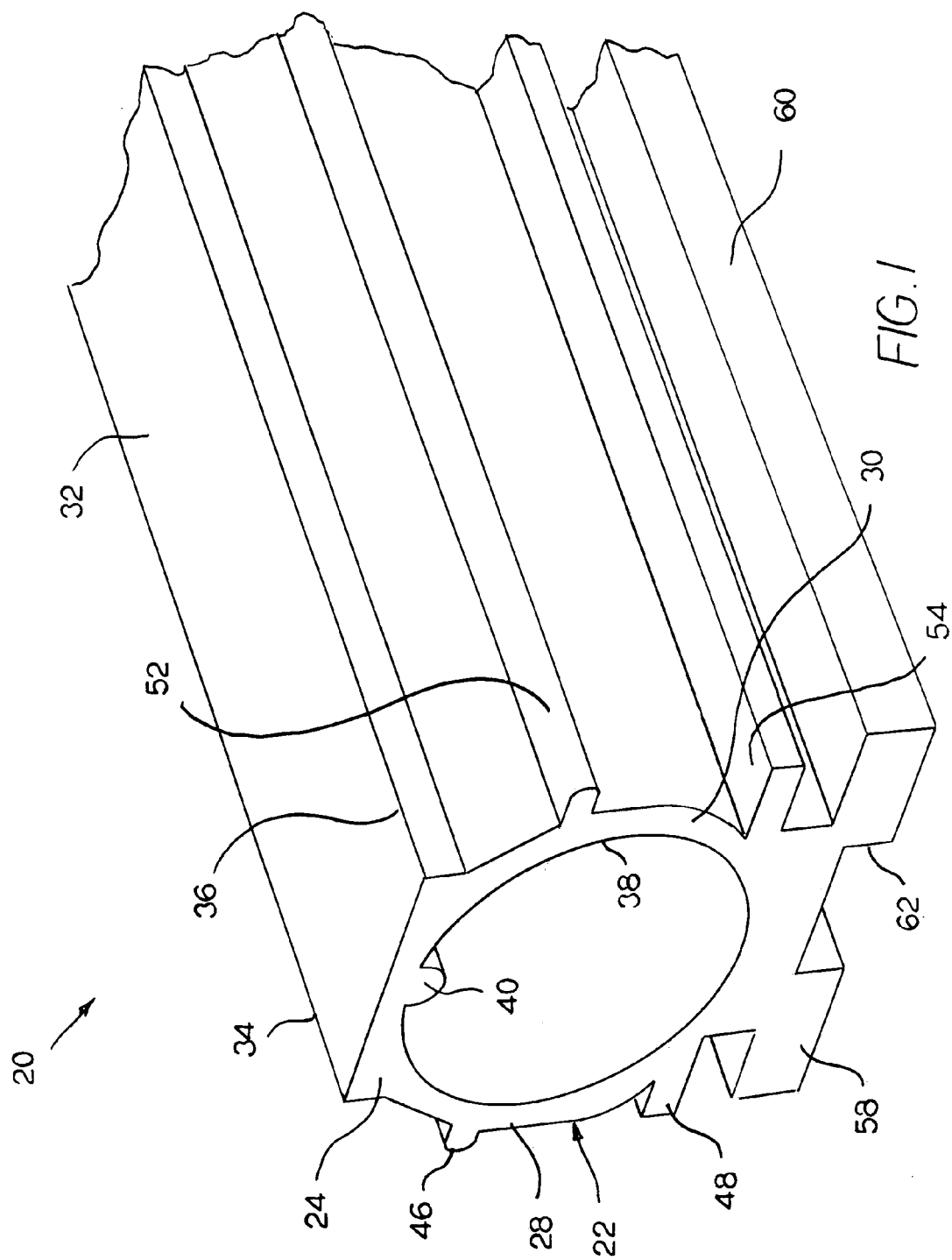
FIG. 1 is an isometric view of a portion of the length of a specific embodiment of the sealing gasket.
Figure 2:
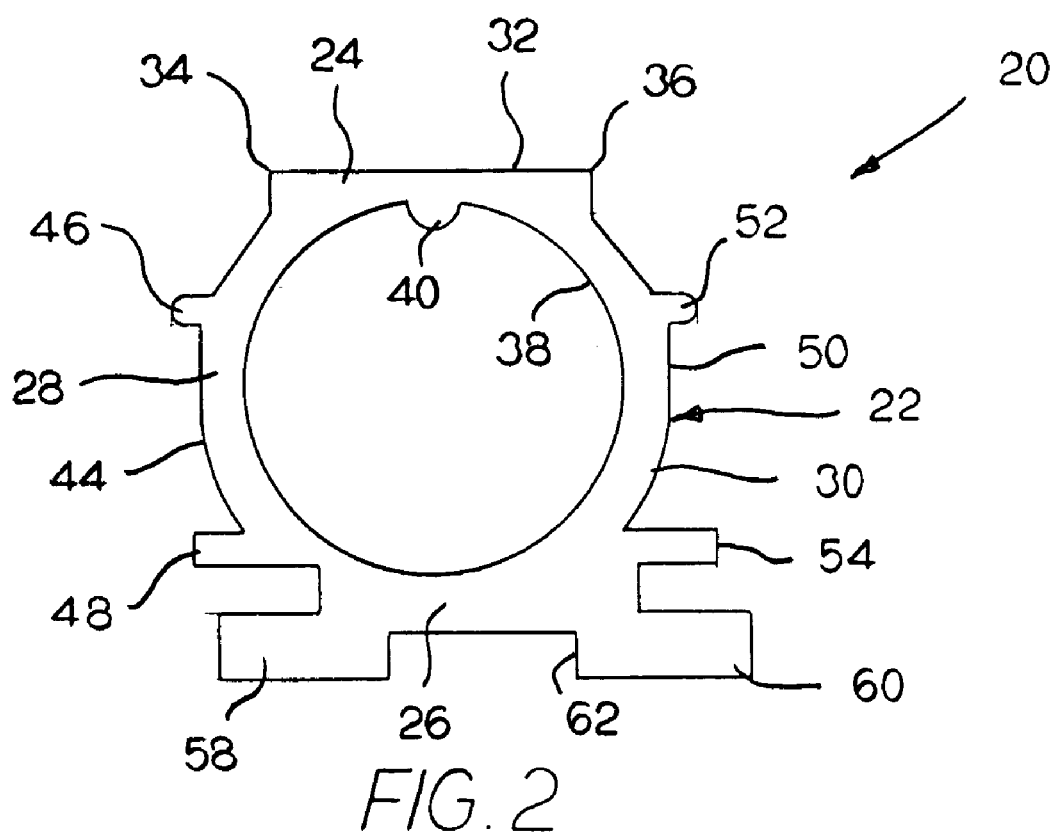
FIG. 2 is a side view of the specific embodiment of the sealing gasket of FIG. 1.

Referring to the drawings, FIGS. 1 and 2 show the structure of a specific embodiment of the sealing gasket (typically made of an elastomeric material) generally designated by an arrow as 20. Applicant points out that throughout this application reference may be made to features that are at the top or the bottom or the sides a shown in the drawings. It should be appreciated that unless set forth in the claims, the use of this type of language is for ease of setting out a reference point, and should not considered as limiting on the scope of the invention.

Sealing gasket 20 has a gasket body 22 that is shown by an arrow. The gasket body 22 has a top portion 24 and a base portion 26. The gasket body 22 further includes one side portion 28 and another side portion 30 wherein these side portions join the top portion 24 and the base portion 26. There is a flat gutter-forming surface 32 at the top portion 24 wherein the flat gutter-forming surface 32 has one sealing edge 34 and an opposite other sealing edge 36. The gasket body 22 also includes an interior generally cylindrical surface 38 wherein a radial inward projection 40 projects in a radial inward direction from the interior surface 38 adjacent the top portion 24.

The one side portion 28 has an exterior side surface 44. A sealing projection 46 projects in an outward direction from the exterior side surface 44. A base sealing projection 48 also projects in an outward direction from the exterior side surface 44. The other side portion 30 has an exterior side surface 50. A sealing projection 52 projects in an outward direction from the exterior side surface 50. A base sealing projection 54 also projects in an outward direction from the exterior side surface 50.

The base portion 26 has a pair of feet (58, 60) wherein these feet (58, 60) are separated by a channel 62. It should be appreciated that the gasket is offset relative to the base portion 26. More specifically, the upper portion of the gasket body 22 is offset to the left as viewed in FIG. 2. By providing this offset, applicant ensures that the entire gasket 20 is in contact with the doors as will be described hereinafter.

Figure 3:
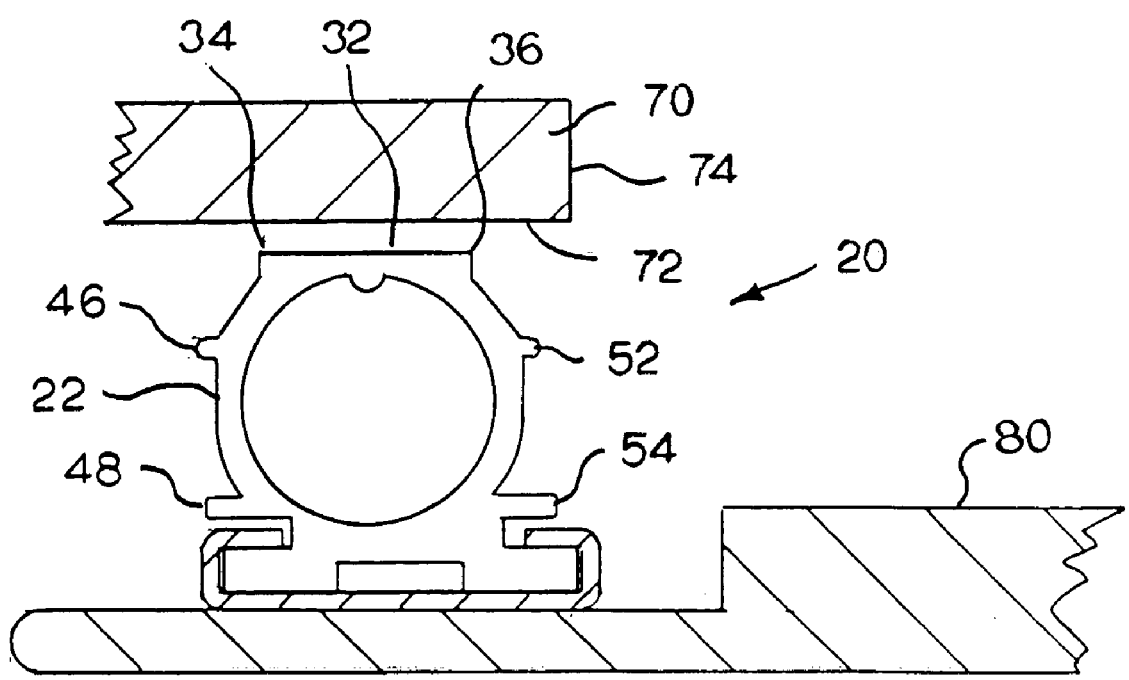
FIG. 3 is a side schematic view of the specific embodiment of the sealing gasket of FIG. 1 wherein the rail car door and the rail car door frame are shown in cross-section, and the sealing gasket is shown in an uncompressed condition where the rail car door is open.
Figure 4:
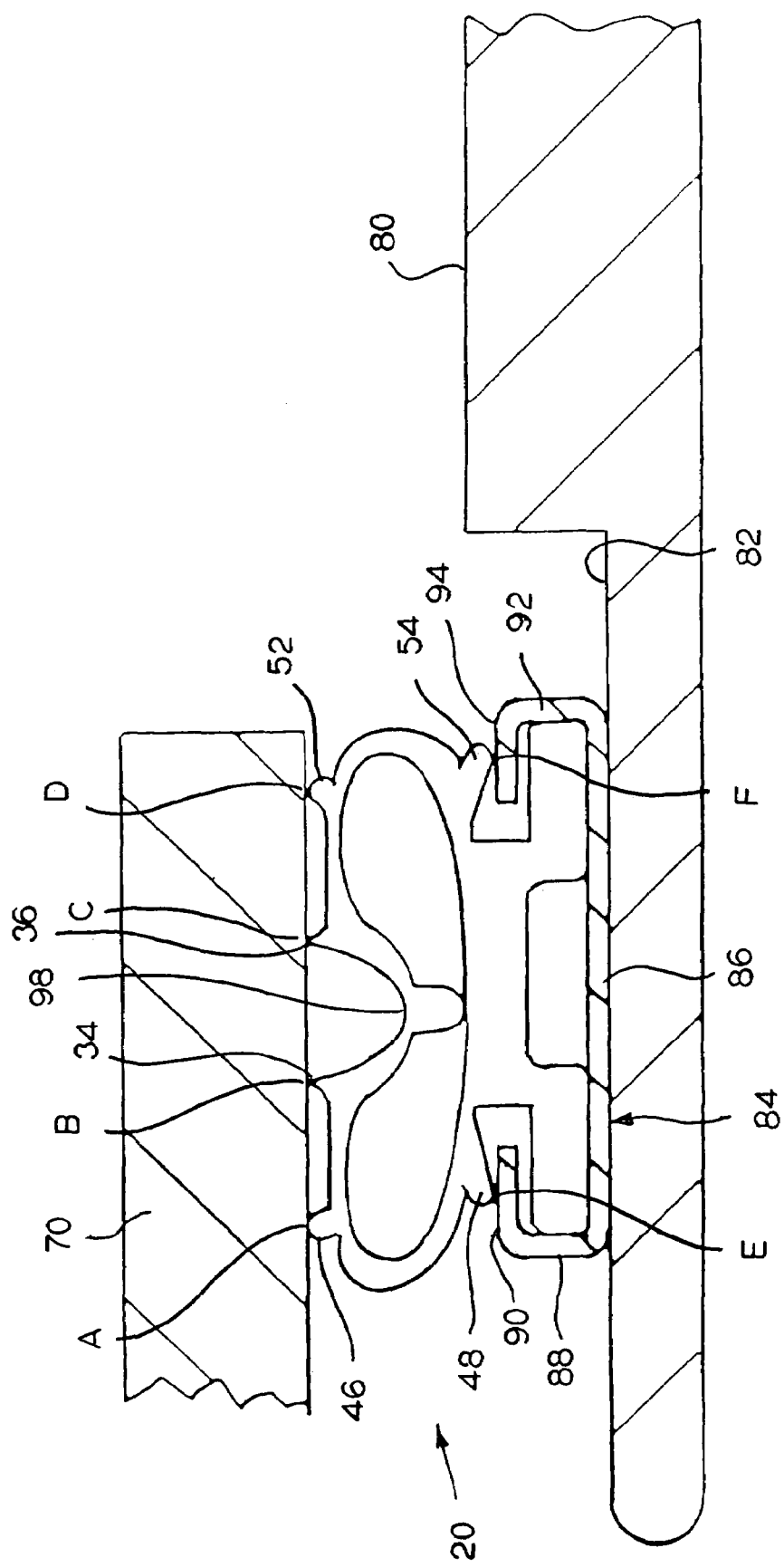
FIG. 4 is a side schematic view of the specific embodiment of the sealing gasket of FIG. 1 wherein the rail car door and the rail car door frame are shown in cross-section, and the sealing gasket is shown in a compressed condition where the rail car door is closed and the sealing gasket provides a seal between the rail car door and the rail car door frame.

Referring to FIGS. 3 and 4, the railroad car has one overlapping door 70 that presents an interior surface 72 and an edge 74. There is another overlapping door 80 that has a channel portion 82. A retainer 84 is mounted in the channel portion 82 wherein the retainer has a base 86 with upstanding side portions (88, 92). Side portion 88 has a sealing surface 90 and side portion 92 has a sealing surface 94.

FIG. 3 illustrates the gasket seal 20 in an uncompressed condition. When in this uncompressed condition, the gasket seal 20 does not provide a seal between the overlapping car doors 70 and 80. FIG. 4 shows the gasket seal 20 in a compressed condition wherein the gasket seal 20 provides sealing between the car doors 70 and 80.

In regard to the operation of the sealing gasket 20, as can be seen from the drawings, and especially from FIGS. 3 and 4, as the car door 70 closes it contacts the flat gutter-forming surface 32 that is at the top portion 24 of the gasket body 22. as the car door 70 continues to close, it exerts a force on the gasket 20 that causes it to compress to eventually the fully compressed condition as shown in FIG. 4. When in the fully compressed condition, such as is shown in FIG. 4, there are a number of sealing points formed by the gasket 20.

The sealing gasket 20 forms four sealing points with the interior surface 72 of the door 70. These sealing points are due to the contact between the interior surface 72 of the door 70 and the following parts of the gasket 20: the sealing projection 46, the one sealing edge 34, the other sealing edge 36 and the sealing projection 52.

As can be seen from a comparison between FIG. 3 and FIG. 4, as the car door 70 closes and moves to compress the gasket 20, the interior cylindrical surface 38 adjacent to the inward projection 40 moves to collapse in a radial inward direction. Such a radial inward collapse causes the sealing projections 46 and 52 to come into contact with the interior surface 72 of the car door 70, and hence, create two points of sealing (sealing points A and D in FIG. 4) between the gasket 20 and the car door 70 at its interior surface 72. The radial inward collapse of the interior cylindrical surface 38 also causes the one sealing edge 34 and the other sealing edge 36 to move into contact with the interior surface 72 of the car door 70 thereby creating two more sealing points (sealing points B and C in FIG. 4) between the gasket 20 and the car door 70 at its interior surface 72. It should be appreciated that the offset (to the left as viewed in FIG. 4) of the upper portion of the gasket ensures that the four sealing points actually contact the interior surface 72 of the one door 70. In the absence of such an offset, there is the potential that not all four sealing points would exist in that, for example, sealing projection 52 may be too far to the right and thus not contact the interior surface 72 of the one door 70.

As can also be seen from a comparison between FIG. 3 and FIG. 4, the collapse of the interior cylindrical surface 38 adjacent to the inward projection 40 create a gutter 98. To the extent that any water or other contaminant would get past the sealing points (A through D), the water (or other contaminants) would encounter the gutter 98. The gutter 98 functions to facilitate carrying any water away from the interior surface rail car. As is clear from the illustration in FIG. 3, the sealing gasket 20 has a minimum thickness in the portion of the sealing gasket 20 along the flat gutter-forming surface 32. As is clear from the illustration in FIG. 4, the gutter 98, when formed, presents a maximum depth that is greater than the minimum thickness of the sealing gasket 20 along the flat gutter-forming surface 32.

As can be seen from a comparison between FIG. 3 and FIG. 4, as the car door 70 closes and moves to compress the gasket 20, the base sealing projection 48 and the base sealing projection 54 is urged into contact with the surfaces (90, 94) of the retainer 84. Thus, sealing projection 48 creates a sealing point E between the gasket 20 and the surface 90 of the retainer 84, and sealing projection 52 creates a sealing point F between the gasket 20 and the surface 94 of the retainer 84.

It can thus be appreciated that the present invention provides a sealing gasket, and especially a sealing gasket to seal between overlapping members of a rail car door assembly that exhibits a number of advantages. The present sealing gasket provides for the creation of a plurality of sealing points that provide fluid-tight seals between the overlapping car doors. These sealing points include a plurality of sealing points adjacent the top portion of the sealing gasket and sealing points adjacent the base portion of the sealing gasket. The sealing gasket also provides for a gutter that functions to carry water (or other contaminants) away from the interior of the rail car.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed:

1. A sealing gasket-retainer assembly that provides a seal between two members, the assembly comprising:
  a retainer affixed to one of the members;
  a gasket comprising a base at one end of the gasket, and the base directly contacts the retainer, and a planar non-arcuate surface at the opposite other end of the gasket, and wherein the planar non-arcuate surface defines essentially all of the opposite end of the gasket;
  a pair of side surfaces joining the one end of the gasket and the opposite other end of the gasket, and wherein the pair of side surfaces intersect the planar non-arcuate surface to form a pair of edges;
  the sealing gasket being movable between a compressed condition wherein the gasket provides a seal between the two members and an uncompressed condition wherein the gasket does not provide a seal between the two members; and
  when the gasket is in the compressed condition, the planar non-arcuate surface deforms so that each one of the pair of edges contacts one of the members.

2. The sealing gasket-retainer assembly of claim 1 wherein the gasket further comprising a pair of retainer seals, each one of the retainer seals projecting from its corresponding one of the side surfaces; and when the gasket is in the compressed condition, each one of the retainer seals deforms so as to contact the retainer and form a seal with the retainer.

3. The sealing gasket-retainer assembly according to claim 1 wherein the planar non-arcuate surface includes at least one sealing edge, and when the gasket is in the compressed condition, the sealing edge contacts one of the members.

4. The sealing gasket-retainer assembly according to claim 3 wherein the planar non-arcuate surface includes a second sealing edge, and when the gasket is in the compressed condition, the second sealing edge contacts the one member.

5. The sealing gasket-retainer assembly according to claim 1 wherein the gasket has an interior surface, and a radial inward projection projects in a radial inward direction from the interior surface at a location adjacent to the opposite other end of the gasket

6. The sealing gasket-retainer assembly according to claim 5 wherein the when the gasket is in the compressed condition, the radial inward projection contacts a portion of the interior surface adjacent to the base.

7. The sealing gasket-retainer assembly according to claim 1 wherein the planar non-arcuate surface is offset from the base.

8. A sealing gasket-retainer assembly that provides a seal between two members, the assembly comprising:
- a retainer affixed to one of the members;
- a sealing gasket;
- the sealing gasket being movable between a compressed condition wherein the gasket provides a seal between the two members and an uncompressed condition wherein the gasket does not provide a seal between the two members;
- the sealing gasket comprising a base at one end of the sealing gasket, and the base directly contacts the retainer;
- the sealing gasket further comprising a planar gutter-forming surface at an opposite other end of the sealing gasket wherein when the sealing gasket is in the uncompressed condition, the surface is planar, and when in the sealing gasket is in the compressed condition, the surface deforms to form a gutter;
- a pair of sides joining the one end of the sealing gasket and the opposite other end of the sealing gasket;
- the planar gutter-forming surface defining essentially all of the opposite other end of the sealing gasket; and
- the sealing gasket having a minimum thickness along the gutter-forming surface, and the gutter having a maximum depth greater than the minimum thickness of the sealing gasket along the gutter-forming surface.

9. The sealing gasket-retainer assembly according to claim 8 wherein the planar gutter-forming surface includes at least one sealing edge, and when the sealing gasket is in the compressed condition, the sealing edge contacts one of the members.

10. The sealing gasket-retainer assembly according to claim 8 wherein the planar gutter-forming surface includes a second sealing edge, and when the sealing gasket is in the compressed condition, the second sealing edge contacts the other member.

11. The sealing gasket-retainer according to claim 8 wherein the sealing gasket further includes a pair of side portions that join the base and the planar gutter-forming surface, and each side portion includes a sealing projection, and when the sealing gasket is in the compressed condition, the sealing projections contact one of the members.

12. The sealing gasket-retainer assembly according to claim 8 wherein the sealing gasket has an interior surface, and a radial inward projection projects in a radial inward direction from the interior surface at a location adjacent to the opposite other end of the sealing gasket.

13. The sealing gasket-retainer assembly according to claim 12 wherein the when the sealing gasket is in the compressed condition, the radial inward projection contacts a portion of the interior surface adjacent to the base.

14. The sealing gasket-retainer assembly according to claim 8 wherein the planar gutter-forming surface is offset from the base.

* * * * *